(12) United States Patent
Kunkel et al.

(10) Patent No.: US 8,488,278 B2
(45) Date of Patent: Jul. 16, 2013

(54) SLIDER WITH IMPROVED ROBUSTNESS TO PARTICLE CONTACT

(75) Inventors: Gary Joseph Kunkel, Minneapolis, MN (US); Quinn J. Haddock, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 903 days.

(21) Appl. No.: 12/604,827

(22) Filed: Oct. 23, 2009

(65) Prior Publication Data

US 2011/0096441 A1 Apr. 28, 2011

(51) Int. Cl.
*G11B 5/60* (2006.01)

(52) U.S. Cl.
USPC .................................................... 360/236.7

(58) Field of Classification Search
USPC ............. 360/235.6, 235.9, 236.4, 236.7, 237, 360/246.2
See application file for complete search history.

(56) References Cited

U.S. PATENT DOCUMENTS

| | | | |
|---|---|---|---|
| 5,490,025 A * | 2/1996 | Dorius et al. | 360/236.4 |
| 5,612,839 A * | 3/1997 | Jacques | 360/246.2 |
| 5,751,517 A | 5/1998 | Agarwal | |
| 5,910,864 A * | 6/1999 | Hira et al. | 360/235.9 |
| 6,198,601 B1 * | 3/2001 | Hira et al. | 360/235.9 |
| 6,330,131 B1 * | 12/2001 | Nepela et al. | 360/234.5 |
| 6,452,750 B1 * | 9/2002 | Fukuroi et al. | 360/236.4 |
| 6,483,668 B2 * | 11/2002 | Hipwell et al. | 360/235.9 |
| 6,744,602 B2 | 6/2004 | Rao et al. | |
| 6,804,878 B1 | 10/2004 | Campbell et al. | |
| 6,920,015 B2 | 7/2005 | Mundt et al. | |
| 7,217,666 B2 | 5/2007 | Guthrie et al. | |
| 7,230,797 B1 | 6/2007 | Liu | |
| 2003/0169535 A1 * | 9/2003 | Boutaghou | 360/236.5 |

OTHER PUBLICATIONS

Takayuki Yamamoto, Yoshiharu Kasamatsu and Hiroyuki Hyodo, "Advanced Stiction-Free Slider and DLC Overcoat," Fujitsu Sci. Tech., Dec. 2001, pp. 201-211, vol. 37, No. 2.

"Preparation of Hard Disk Drive Magnetic Recording Media for XTEM Analysis," Laboratory Report 11, Model 590, pp. 1-3, South Bay Technology, Inc., San Clemente, CA.

* cited by examiner

*Primary Examiner* — Angel Castro
(74) *Attorney, Agent, or Firm* — Hall Estill Attorneys at Law

(57) ABSTRACT

In a disc drive, a slider having electronic communication with the surface of a data disc, the slider having a first up-track mill transition that has a transition mill to remove oblique mill transitions so that the transition has a substantially perpendicular portion that impacts contaminant particles on or near the disc surface. In other embodiments, other edges of the slider have transition mills to remove oblique transition mills from possible impact with such particles.

20 Claims, 5 Drawing Sheets

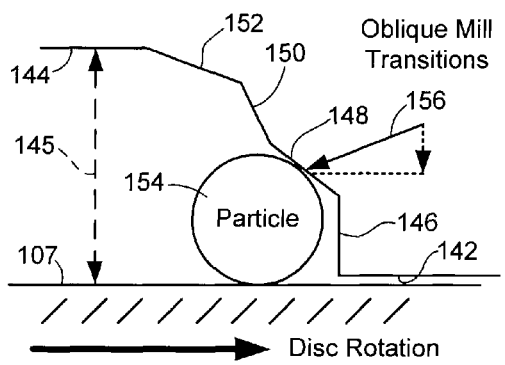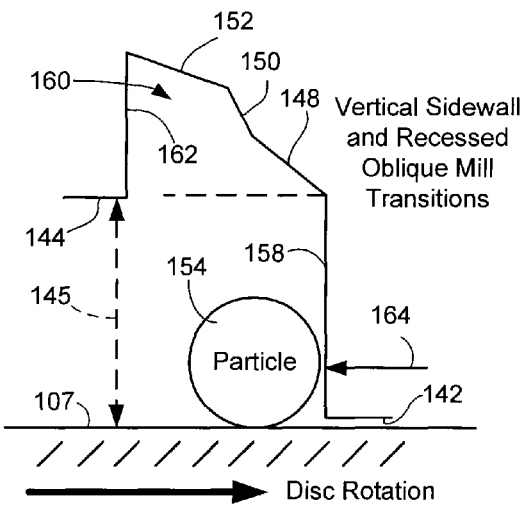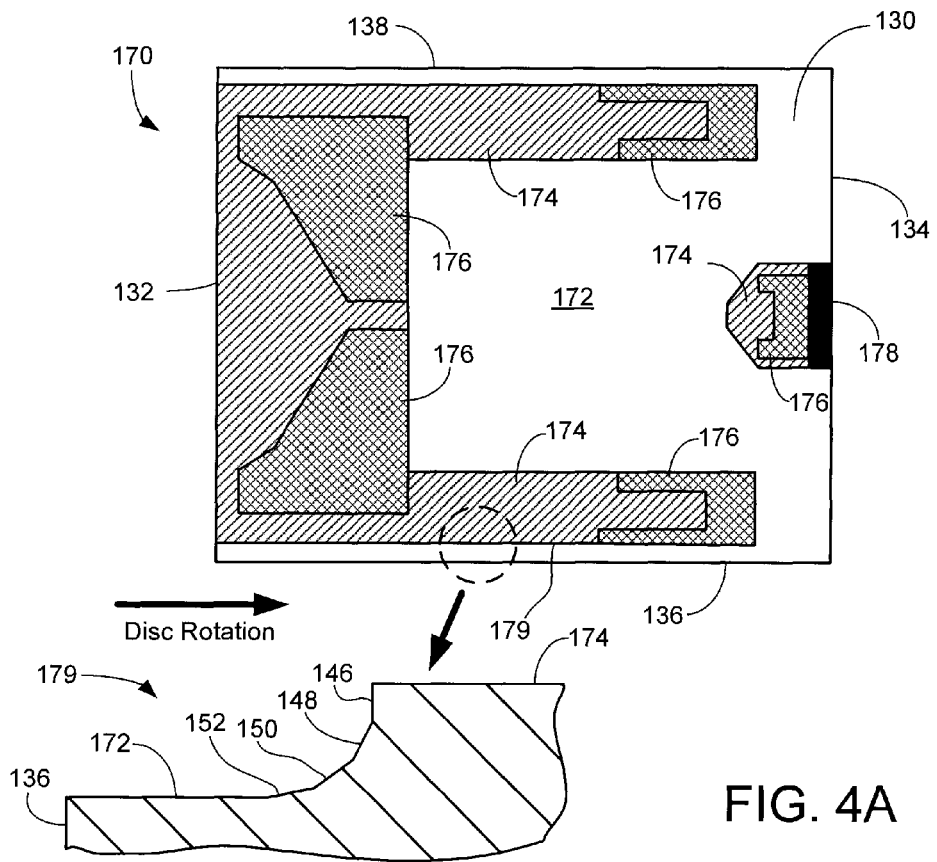

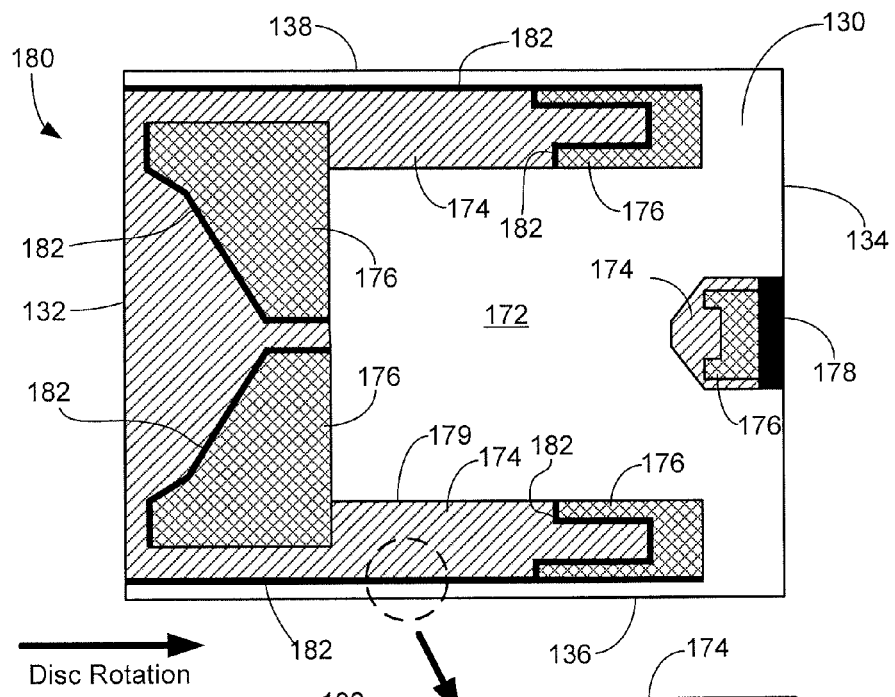
Disc Rotation
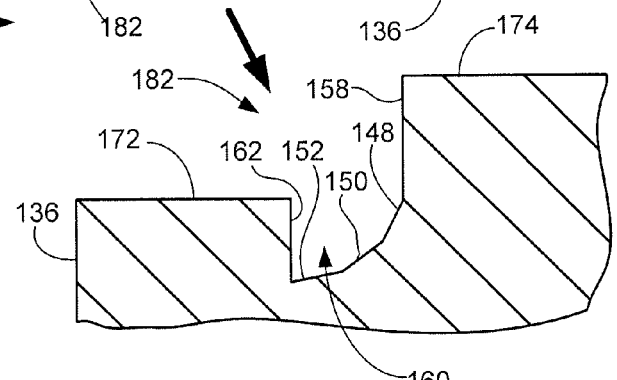
FIG. 4B
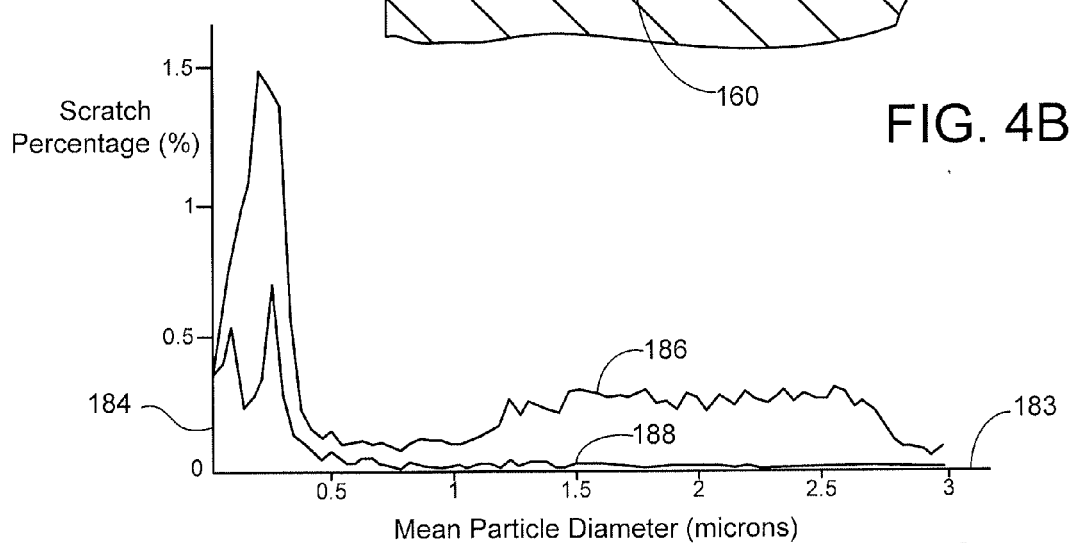
FIG. 5

SLIDER WITH IMPROVED ROBUSTNESS TO PARTICLE CONTACT

SUMMARY

Various embodiments of the present invention are generally directed to a slider configured to establish an air bearing adjacent a rotatable surface, such as a slider in a data storage device which supports a data transducer adjacent a data storage surface.

In accordance with various embodiments, the slider comprises a slider body having a leading edge, a trailing edge, opposing side edges, and a facing surface adapted to form an air bearing with an adjacent rotating surface. An up-track edge of the facing surface has a transition mill with a recessed oblique mill transition to present a substantially vertical impact edge to a particle disposed on the rotating surface.

Other features and aspects that characterize various embodiments of the present invention will be apparent from the following detailed description and the appended drawings and claims.

BRIEF DESCRIPTION OF THE DRAWINGS

FIG. 3A is a diagrammatical representation of a slider with an oblique mill transition surface.

FIG. 3B diagrammatically represents a slider with a substantially orthogonal (vertical) particle impact surface and one or more recessed oblique mill transition surfaces.

FIG. 4A is a bottom plan view of a slider configured as shown in FIG. 3A.

FIG. 4B is a bottom plan view of a slider configured as shown in FIG. 3B.

FIG. 5 is a graph of particle scratch percentages as a function of particle diameter for the exemplary sliders of FIGS. 4A-4B.

DESCRIPTION

The present disclosure is generally directed to a slider design with improved particle sensitivity characteristics. Sliders can be used in a variety of applications, such as but not limited to the environment of a data storage device in which the slider is hydrodynamically supported above a data storage surface to present a transducer for data transfer operations. Such hydrodynamic support mechanisms are referred to herein as air bearings even if the associated fluid is something other than atmospheric air, such as in the case of an inert low density gas environment (e.g., Helium).

As will be appreciated, particulate debris (particles) can sometimes become positioned between the rotating surface and the slider air bearing surfaces. Depending on the size and transport mechanism of the particles, the particles may interact with different features of the air bearing surfaces. One sensitive feature of air bearing surfaces is the transition between one depth and another. Often these transitions are oblique to the disc, forming a wedge shape.

When a particle gets jammed between an oblique transition and the surface, contact forces upon the particle may be directed into the disc surface. Depending on the amount of force and particle characteristics, this head-disc-particle contact can cause significant damage to the disc as the driven particulate scratches or gouges the associated surface. Accordingly, a novel slider configuration is disclosed herein which reduces the potential for damage from such head-disc-particle contact.

Figure 1:
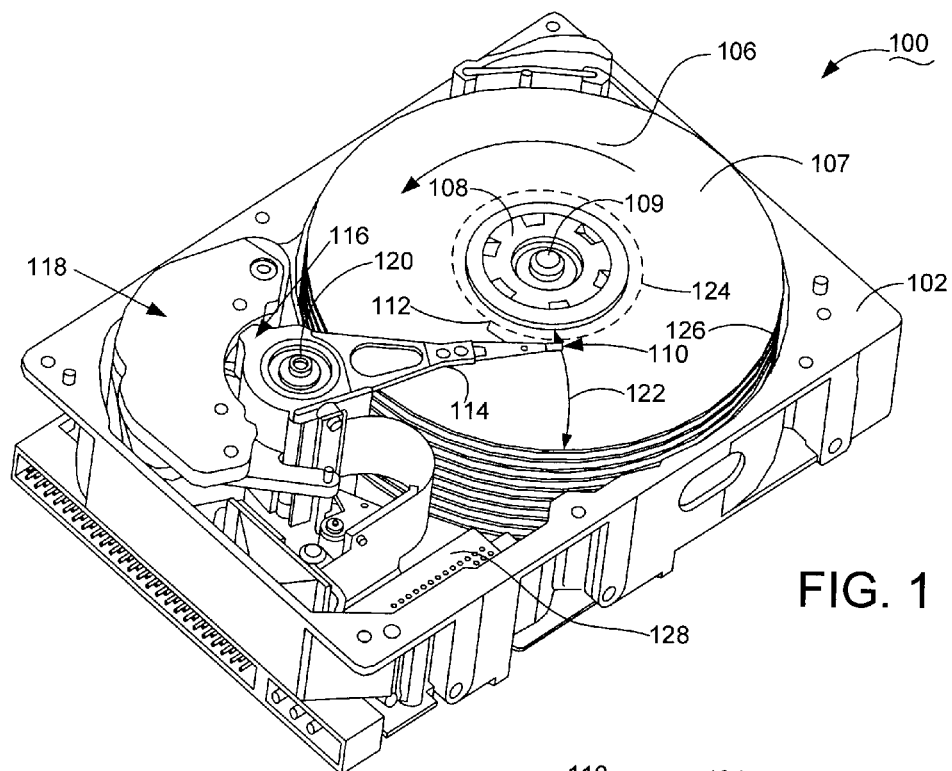
FIG. 1 is an isometric view of a hard disc drive having embodiments of the present invention.

FIG. 1 is an isometric view of a disc drive data storage device 100 in which embodiments of the present invention can be employed. The disc drive 100 includes a housing with a base 102 and a top cover (not shown). A disc pack 106 of discs 107 is mounted on a spindle motor (not shown) by a disc clamp 108 and rotated about a central axis 109. It will be understood that the various embodiments discussed herein are not dependent on a particular number of discs, and indeed, are not necessarily limited to the environment of a data storage device.

The exemplary device 100 of FIG. 1 provides an associated slider 110 for each operable surface of the discs 107. Each slider supports a data transducer for communication with the disc surface. The data transducers may be characterized as read/write heads with separate read and write elements. The elements may be disposed adjacent a trailing edge of the associated sliders, or in other suitable locations.

Figure 2A:
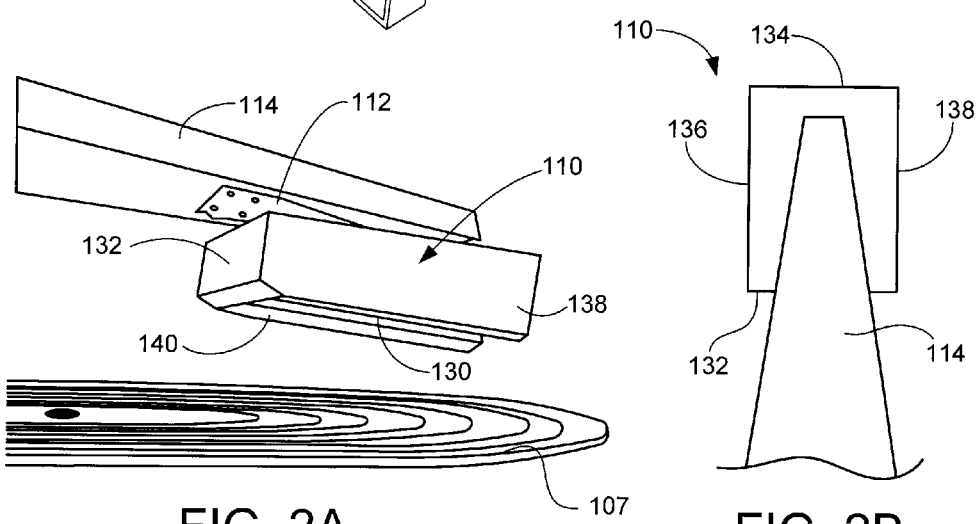
FIG. 2A is a partially detailed isometric view of a slider and actuator arm arrangement.
Figure 2B:
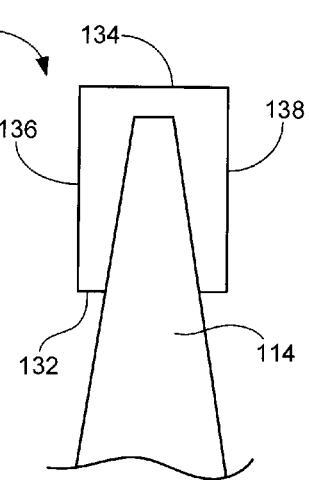
FIG. 2B shows a top plan representation of the slider and actuator arm of FIG. 2A.

An exemplary slider 110 is depicted in FIGS. 2A-2B. The slider 110 is supported by a suspension 112, which is in turn attached to an actuator arm 114 of actuator 116 (FIG. 1). The actuator 116 is a rotary moving coil actuator that includes a voice coil motor (VCM) 118 that rotates the actuator 116 about an actuator shaft 120 to position the sliders 110 over a desired data track along a path 122 between a disc inner diameter 124 and a disc outer diameter 126. The voice coil motor 118 is driven by servo electronics 128 based on signals generated by the sliders 110 and associated control electronics (not shown).

The slider 110 has a substantially rectangular slider body with an underlying, disc facing surface 130, a leading edge 132, a trailing edge 134, an ID facing side surface 136 which faces the innermost diameter of the associated disc 107, and an OD facing surface 138 which faces the outermost diameter of the disc 107. The composition, style and size of the slider 110 can vary depending on the requirements of a given application. An exemplary footprint size of the slider may be about 1.2 millimeters, mm in length and about 1.0 mm in width.

Air bearing surfaces 140 project from the facing surface 130 to establish stable flight upon fluidic currents established by disc rotation. As the discs 107 are rotated, each disc drags fluid (e.g., air) under its associated slider 110 along its air bearing surfaces in a direction approximately parallel to the tangential velocity of the discs. As air passes beneath the air bearing surfaces, air compression along the air flow path causes the air pressure between the discs and the air bearing surfaces to increase, creating hydrodynamic lifting forces that counteract the load force provided by suspensions 112 and causes the sliders 110 to fly in close proximity to the surfaces of the discs 107.

The sliders 110 are configured to pitch and roll in response to the topography of the disc surfaces. The slider 110 may be configured to fly with a small positive pitch angle so that the read/write elements along the trailing edge 134 are located near the closest point on the slider to the disc. In the context of the following discussion, however the slider will be shown positioned in a plane that is generally parallel with the disc surface.

In accordance with various embodiments, a mill or other process for material removal is utilized in between mill depths of different elevations (or depths) on the slider to recess oblique mill transition surfaces that can be impacted by sizable contaminant particles. Such transition surfaces are herein referred to as "transition mills" or "furrow mills." In this way, the sliders are adapted with leading edge characteristics to assure that contaminant particles that strike the area will encounter a substantially orthogonal (e.g., vertical) wall rather than the oblique transitions commonly remaining after conventional milling or other material processing.

FIG. 3A shows a side elevational, schematic representation of an exemplary slider configuration with oblique mill transitions between an air bearing surface 142 and a recessed surface 144. The respective surfaces 142, 144 are disposed on the slider facing surface 130 and are separated by an elevational distance (depth) 145. Transition surfaces 146, 148, 150 and 152 connect the surfaces 142, 144 and are respectively formed using various process steps as appropriate, such as via a standard ion mill. Fewer or greater numbers of transition surfaces may be employed, and the respective angles can vary over that shown so it will be understood that the transition mill configuration of FIG. 3A is merely illustrative and not limiting.

A particle 154 is depicted as being in the position of impact with a portion of the transition surfaces as the particle 154 is dragged along with the air current induced by the rotation of the discs, or by being present on the surface of the disc 107. For the purpose of description herein, the portion of the leading edge (or other impact edge herein below) that is impacted by the particle 154 will be referred to as an up-track edge. This convention will be used even if tracks are not formed on the associated rotatable surface (e.g., disc 107).

A force vector 156 indicates that the particle will be driven downwardly toward the surface of the disc 107, so there is a possibility that the particle will be jammed in between the transition mills 146-152 and the disc 107. Depending on the characteristics of the particle and the disc, this can cause significant damage to the disc, including data loss.

FIG. 3B depicts a schematic representation of a slider configuration processed in accordance with various embodiments. As before, transition mills are provided between respective surfaces 142, 144. However, additional processing is applied to provide a substantially orthogonal transition surface (vertical wall) 158 that extends over the elevational distance 145 between the surfaces 142, 144. The transition mills 146-152 of FIG. 3B extend from the base of the surface 158 so as to be recessed within a channel 160. A second substantially orthogonal transition surface 162 interconnects surfaces 144 and 152. In this way, the oblique geometry of the mill transitions are pushed upward into the slider with an additional mill deeper than that the collective mills 146-152.

Force arrow 164 represents the contact force of the vertical wall 158 on the particle 154. Unlike in FIG. 3A, the force 164 in FIG. 3B will be substantially parallel to the disc 107, resulting in reduced risk of damage. It will be appreciated that recessed oblique mill transitions represented in FIG. 3B can be applied between any respective elevations to improve particle robustness. Generally, transitions from FIG. 3B can be applied to leading edge surfaces where particle exposure is expected to occur, and transitions from FIG. 3A can be applied elsewhere.

From the foregoing discussion it can be seen that the parallel surfaces 142, 144 in FIG. 3B can be characterized as first and second surfaces separated by the elevational distance 145. The first surface may be an air bearing surface and the second surface may be a recessed surface.

The vertical wall 158 constitutes a third surface substantially orthogonal to and extending from the first air bearing surface over said selected elevational distance. A fourth surface, such as at least a selected one of the oblique mill transitions 148-152, extends between the second and third surfaces at an oblique angle to the first, second and third surfaces.

The third surface 158 provides an impact surface to direct the particle 154 on the rotatable surface in a direction away from the rotatable surface upon contact with the third surface. The fourth surface 146-152 forms a sidewall of a channel 160 which extends into the slider body adjacent the second surface. While not necessarily required, the channel 160 will have an overall depth less than the selected elevational distance, as shown.

As desired, the configuration of FIG. 3A can be mirrored and placed downstream of the transition of FIG. 3B, since oblique transitions on a downstream facing surface may carry little risk of particulate contact. In such case, the third surface (158 in FIG. 3B) is upstream with respect to the direction of fluidic flow, and the respective surfaces 148-152 in mirrored FIG. 3A may be individually or collectively characterized as a fifth surface which extends from the first surface downstream from the direction of fluidic flow at an oblique angle with respect to the first and second surfaces.

Continuing with the drawings, FIG. 4A is a bottom plan view of an exemplary slider 170 with oblique mill transitions in accordance with FIG. 3A. Like reference numerals are used to denote similar components throughout. The slider 170 includes various surfaces at different relative elevations with respect to the facing disc surface (not shown).

Recessed surfaces 172 are unpatterned. Air bearing surfaces 174 which extend above the recessed surfaces 172 by a first elevational distance are shown in single (/) cross-hatch. Raised air bearing surfaces 176 which extend above the bearing surfaces 174 are shown in double (x) cross-hatch. A read/write transducer assembly 178 is shown in solid black and is disposed along the trailing edge 134. It will be appreciated that any number of air bearing configurations can be utilized, so that the configuration of FIG. 4A is merely illustrative and not limiting. The transitions between the respective elevations 172, 174 and 176 will each have an oblique mill transition configuration, such as the exemplary transition illustrated in FIG. 4B.

FIG. 4B is a bottom plan view of an exemplary slider 180 with recessed mill transitions in accordance with FIG. 3B. These transitions are denoted by solid, thick black lines 182 and are provided along exposed leading edge surfaces of the raised bearing surfaces 176 that are likely to encounter particles. Thus, other leading edge surfaces can be selected with the recessed configuration. It will be appreciated that the remaining transitions in FIG. 4B may be provided with oblique mill transitions as shown in FIG. 3A.

FIG. 5 is a graph of scratch percentage characteristics of the respective sliders 170, 180 of FIGS. 4A and 4B as a function of particle diameter. Mean particle diameter is provided along x-axis 183, and percentage of detectable scratches or other surface damage is represented along y-axis 184. Curve 186 shows exemplary performance of the slider 170 and curve 188 shows exemplary performance of the slider 180. It can be seen that oblique mill transitions are significantly more sensitive to both sub-micron and super-micron particles as compared to the orthogonal wall design. Indeed, damage from particles greater than about 0.5 microns ($5\times10^{-7}$ meters) is shown to be is almost entirely eliminated by the slider 180 of FIG. 4B.

Figure 6A:
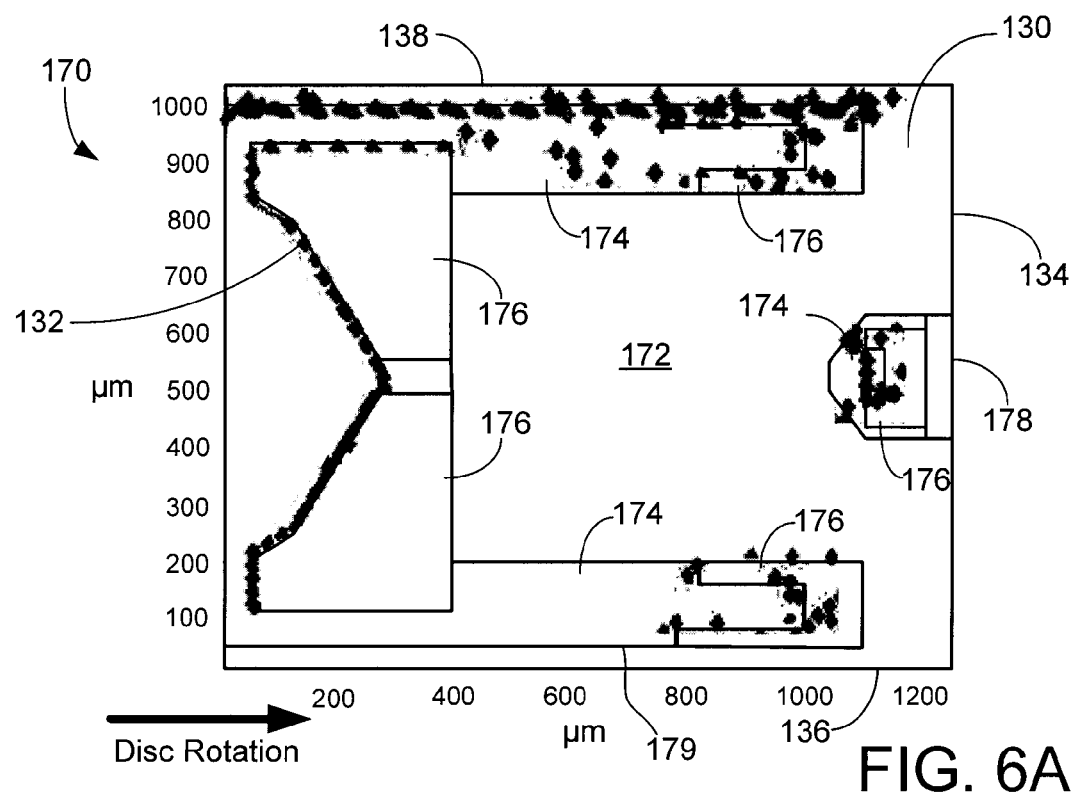
FIG. 6A shows exemplary particle contact locations for the slider of FIG. 4A.
Figure 6B:
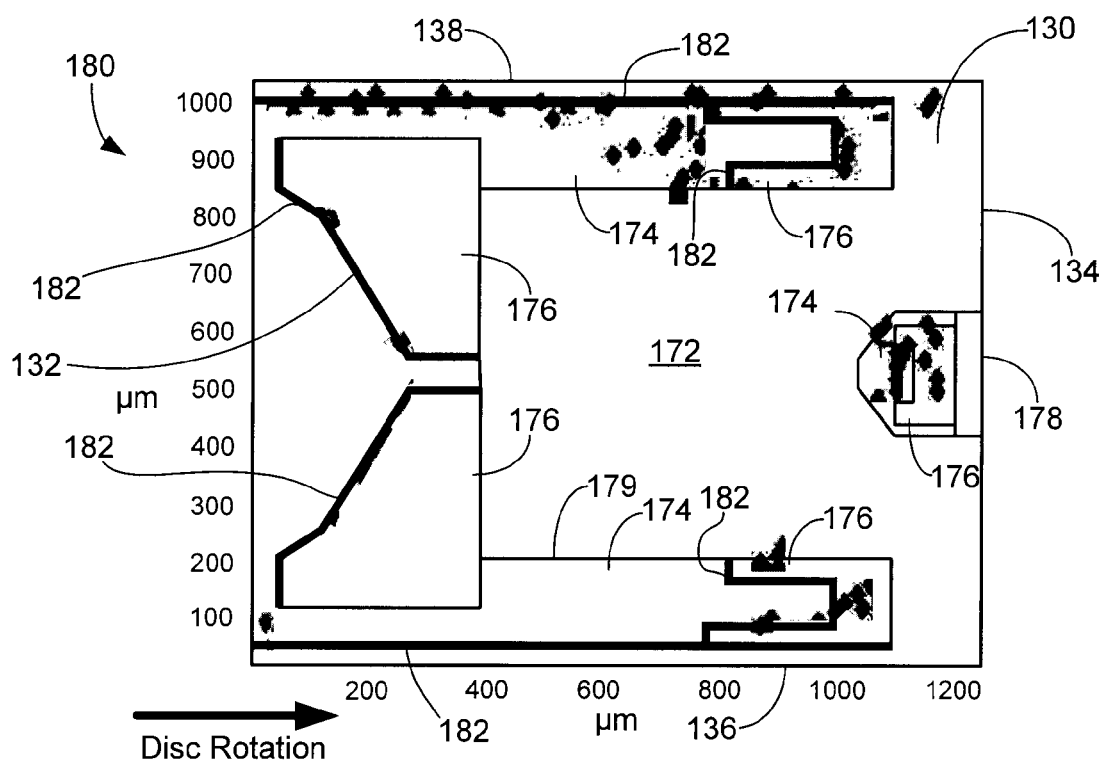
FIG. 6B shows corresponding exemplary particle contact locations for the slider of FIG. 4B.

FIGS. 6A and 6B show example locations (diamond shaped marks) on the respective slider surfaces where the particles that cause the scratches depicted in FIG. 5 contact the slider 110. FIG. 6A shows the scratching locations for the slider 170, and FIG. 6B shows the scratching locations for the slider 180. Due to this specific slider orientation, the particles substantially only contact the upper side edge. From these figures it can be seen that the recessed transition mills can reduce overall particle sensitivity to a uniform distribution of particle sizes by a factor of about 5× (~500%).

Figure 7:
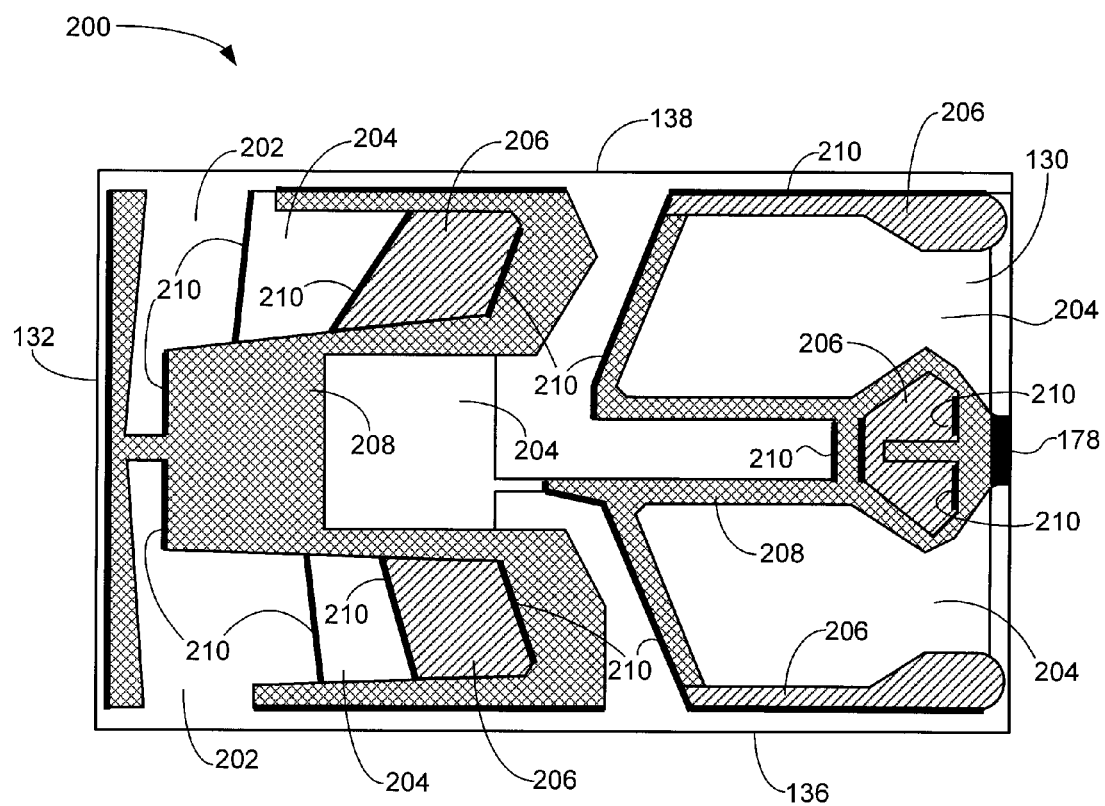
FIG. 7 shows another exemplary slider with the transitions of FIGS. 3A-3B.

FIG. 7 shows another exemplary configuration for a slider 200. The slider 200 includes first and second recessed surfaces 202, 204, and first and second air bearing surfaces 206, 208. Substantially orthogonal transition surfaces with recessed oblique transition mills are represented at 210. The slider 200 utilizes the surfaces 210 along various inner particle impact edges to further reduce susceptibility to particle-disc-contact damage.

While the various embodiments presented herein are generally provided in the context of a data storage device, it will be appreciated that this is merely for purposes of illustration and is not limiting. Rather, the exemplary printed circuit assembly as disclosed herein can be readily used in any number of other environments as desired. Due to manufacturing tolerances and other real world factors, reference herein to "substantially orthogonal" and "substantially vertical" and the like will be understood to fall within a reasonable range of absolute orthogonality/verticality (e.g., +/−10%). Contrawise, reference to "oblique" angles will be understood to fall outside such range.

It will be clear that the various embodiments presented herein are well adapted to carry out the ends and advantages mentioned as well as those inherent therein. While presently preferred embodiments have been described for purposes of this disclosure, numerous changes may be made that will readily suggest themselves to those skilled in the art and that are encompassed in the spirit of the invention disclosed and as defined in the appended claims.

What is claimed is:

1. A slider body comprising a facing surface configured for placement in facing relation to a rotatable surface to establish hydrodynamic support of the slider body at a selected fly height, the facing surface comprising parallel first and second surfaces separated by a selected elevational distance, a third surface substantially orthogonal to and extending from the first surface over said selected elevational distance, a fourth surface extending between the second and third surfaces at an oblique angle to the first, second and third surfaces, and a fifth surface extending from the first surface at an oblique angle with respect to the first and second surfaces.

2. The slider body of claim 1, wherein the third surface provides an impact surface to direct a particle on the rotatable surface in a direction away from the rotatable surface upon contact with the third surface, and wherein the fourth surface forms a sidewall of a channel which extends into the slider body adjacent the second surface.

3. The slider body of claim 2, wherein the channel has an overall depth less than the selected elevational distance.

4. The slider body of claim 1, wherein the first surface is characterized as an air bearing surface at a first elevation with respect to the slider body and the second surface is characterized as a recessed surface at a reduced, second elevation with respect to the slider body.

5. The slider body of claim 1, wherein the third surface is upstream with respect to a direction of fluidic flow, and wherein the fifth surface extends from the first surface downstream from the direction of fluidic flow.

6. The slider body of claim 1, further comprising leading, trailing and side edges, wherein the third surface extends along a selected one of the outermost leading or side edges, and wherein the trailing edge supports a read/write transducer.

7. An apparatus comprising:
a slider body adapted for hydrodynamic support adjacent a rotatable surface by fluidic currents established by rotation of the rotatable surface, the slider body comprising a first surface adapted for facing relation to the rotatable surface, a second surface parallel to and recessed from the first surface a first elevational distance, a third surface which extends perpendicularly from the first surface over an entirety of the first elevational distance, and a recessed oblique mill transition disposed between the first and second surfaces comprising a fourth surface extending at a non-orthogonal angle from the third surface to form a recessed channel with an overall depth at a second elevational distance from the first surface greater than the first elevational distance; and
a read/write transducer supported by the slider body.

8. The apparatus of claim 7, in which the recessed oblique mill transition further comprises a fifth surface extending at a different, second non-orthogonal angle from the fourth surface in the recessed channel.

9. The apparatus of claim 8, in which the recessed oblique mill transition further comprises a sixth surface extending into the recessed channel from the second surface at an angle perpendicular to the second surface.

10. The apparatus of claim 7, in which the recessed channel is formed by a plurality of non-orthogonal mill surfaces and at least one orthogonal surface with respect to the second surface.

11. The apparatus of claim 7, in which the slider body further comprises opposing upstream and downstream edges with respect to said fluidic currents, and opposing side edges between the upstream and downstream edges, wherein the read/write transducer is affixed to the slider body adjacent the downstream edge.

12. The apparatus of claim 11, in which the third surface is adjacent the upstream edge of the slider body.

13. The apparatus of claim 11, in which the third surface is adjacent a selected one of the side edges of the slider body.

14. A slider comprising a slider body having a leading edge, a trailing edge, opposing side edges, and a facing surface adapted to form an air bearing with an adjacent rotating surface, the facing surface comprising parallel recessed air bearing surfaces separated by a selected elevational distance, wherein an up-track edge of the facing surface has a transition mill with a recessed oblique mill transition to present a substantially vertical impact edge to a particle disposed on the rotating surface, the recessed oblique mill transition comprising a recessed channel that extends into a body portion of the slider between the recessed surface and the substantially vertical impact edge, the recessed channel formed by a substantially vertical surface extending into the channel from the recessed surface and a plurality of non-orthogonal transition surfaces each extending at a different non-orthogonal angle with respect to the substantially vertical impact edge.

15. The slider of claim 14, further comprising first and second surfaces on the facing surface separated by an elevational distance therebetween, the substantially vertical impact edge extending substantially orthogonally from the first surface a distance at least equal to or greater than the elevational distance between the first and second surfaces, and the recessed oblique mill transition comprising a third surface extending at a non-orthogonal angle from the substantially vertical impact edge within a channel adjacent the second surface.

16. The slider of claim 14, wherein the substantially vertical impact edge extends between the recessed and air bearing surfaces over said selected elevational distance.

17. The slider of claim 14, wherein a first side edge has a transition mill to remove oblique mill transitions from contact with a particle disposed on the rotating surface.

18. The slider of claim 17, wherein an opposing second side edge has a transition mill to remove oblique mill transitions from contact with a particle disposed on the rotating surface.

19. The slider of claim 14, wherein the slider has inner particle impact edges that have transition mills to remove oblique mill transitions from contact with a particle disposed on the rotating surface.

20. The slider of claim 14, further comprising a read/write transducer disposed adjacent said trailing edge.

* * * * *